(12) United States Patent  
Zhao et al.

(10) Patent No.: US 12,475,677 B2  
(45) Date of Patent: Nov. 18, 2025

(54) FECES COLOR-BASED REMOTE SENSING ESTIMATION METHOD AND APPARATUS FOR ANTARCTIC BIRD POPULATION SIZE

(71) Applicants: HAINAN UNIVERSITY, Haikou (CN); SANYA RESEARCH INSTITUTE OF HAINAN UNIVERSITY, Sanya (CN)

(72) Inventors: Peng Zhao, Haikou (CN); Yufei Deng, Haikou (CN); Pengjia Liu, Haikou (CN); Jinmeng Yan, Haikou (CN)

(73) Assignees: HAINAN UNIVERSITY, Haikou (CN); SANYA RESEARCH INSTITUTE OF HAINAN UNIVERSITY, Sanya (CN)

( * ) Notice: Subject to any disclaimer, the term of this patent is extended or adjusted under 35 U.S.C. 154(b) by 429 days.

(21) Appl. No.: 18/098,108

(22) Filed: Jan. 17, 2023

(65) Prior Publication Data

US 2023/0260248 A1    Aug. 17, 2023

(30) Foreign Application Priority Data

Jan. 25, 2022   (CN) ......................... 202210088306.1

(51) Int. Cl.  
*G06V 10/60* (2022.01)  
*G06T 7/90* (2017.01)  
(Continued)

(52) U.S. Cl.  
CPC ............... *G06V 10/60* (2022.01); *G06T 7/90* (2017.01); *G06V 10/25* (2022.01); *G06V 10/761* (2022.01);  
(Continued)

(58) Field of Classification Search  
CPC ...... G06V 10/60; G06V 10/25; G06V 10/761; G06V 10/764; G06V 20/17; G06T 7/90;  
(Continued)

(56) References Cited

U.S. PATENT DOCUMENTS

2016/0232621 A1    8/2016   Ethington et al.

FOREIGN PATENT DOCUMENTS

| CN | 106022457 A | * | 10/2016 | ............ G06M 11/00 |
| CN | 107077650 A | | 8/2017 | |

OTHER PUBLICATIONS

LaRue, M.A., Lynch, H.J., Lyver, P.O.B et al. A method for estimating colony sizes of Adelie penguins using remote sensing imagery. Polar Biol 37, 507-517 (2014). https://doi.org/10.1007/s00300-014-1451-8 (Year: 2014).*

(Continued)

*Primary Examiner* — Chan S Park  
*Assistant Examiner* — Paulo Andres Garcia

(57) ABSTRACT

A feces color-based remote sensing estimation method and apparatus for Antarctic bird population size is disclosed, which comprises: determining a reflectance value range of a mixture of new feces and old feces in a remote sensing image; determining a sample mixture area where the mixture is located, based on the reflectance value range of the mixture in the remote sensing image; classifying the sample mixture area into a plurality of grade areas and determining an area of each grade area based on an obtained reflectance value of the sample mixture area; and generating a one-to-one correspondence between a density of birds of each grade area in the sample mixture area and the each grade area, based on the area of the each grade area and an obtained number of birds in the each grade area.

18 Claims, 7 Drawing Sheets

(51) Int. Cl.
  *G06V 10/25* (2022.01)
  *G06V 10/74* (2022.01)
  *G06V 10/764* (2022.01)
(52) U.S. Cl.
  CPC .. *G06V 10/764* (2022.01); *G06T 2207/10024* (2013.01); *G06T 2207/30242* (2013.01)
(58) Field of Classification Search
  CPC ............. G06T 7/62; G06T 2207/10024; G06T 2207/30242; G06T 2207/10032
  See application file for complete search history.

(56) References Cited

OTHER PUBLICATIONS

Rees WG, Brown JA, Fretwell PT, Trathan PN. What colour is penguin guano? Antarctic Science. 2017; 29(5): 417-425. doi:10.1017/S0954102017000190 (Year: 2017).*

Schwaller M., Southwell C., Emmerson L., Continental-scale mapping of Adélie penguin colonies from Landsat imagery, Remote Sensing of Environment, vol. 139, 2013, p. 353-364, ISSN 0034-4257, https://doi.org/10.1016/j.rse.2013.08.009. (Year: 2013).*

Firla M., Mustafa O., Pfeifer C., Senf M., Hese S., Interseasonal variability of guano stains in a remotely sensed penguin colony using uav and satellite, ISPRS Annals of Photogrammetry, Remote Sensing and Spatial Information Sciences. IV-2/W5. 111-118.10.5194/isprs-annals-IV-2-W5-111-2019. (Year: 2019).*

Bird, C.N.; Dawn, A.H.; Dale, J.; Johnston, D.W. A Semi-Automated Method for Estimating Adelie Penguin Colony Abundance from a Fusion of Multispectral and Thermal Imagery Collected with Unoccupied Aircraft Systems. Remote Sens. 2020, 12, 3692. https://doi.org/10.3390/rs12223692 (Year: 2020).*

Witharana, C.; Lynch, H.J. An Object-Based Image Analysis Approach for Detecting Penguin Guano in very High Spatial Resolution Satellite Images. Remote Sens. 2016, 8, 375. https://doi.org/10.3390/rs8050375 (Year: 2016).*

Lynch HJ, Schwaller MR (2014) Mapping the Abundance and Distribution of Adelie Penguins Using Landsat-7: First Steps towards an Integrated MultiSensor Pipeline for Tracking Populations at the Continental Scale. PLoS ONE 9(11): e113301. doi:10.1371/journal.pone.0113301 (Year: 2014).*

P.T. Fretwell, R.A. Phillips, M. de L. Brooke, A.H. Fleming, A. McArthur, Using the unique spectral signature of guano to identify unknown seabird colonies, Remote Sensing of Environment, vol. 156, 2015, p. 448-456, ISSN 0034-4257, https://doi.org/10.1016/j.rse.2014.10.011. (Year: 2015).*

Attard, M.R.G.; Phillips, R.A.; Bowler, E.; Clarke, P.J.; Cubaynes, H.; Johnston, D.W.; Fretwell, P.T. Review of Satellite Remote Sensing and Unoccupied Aircraft Systems for Counting Wildlife on Land. Remote Sens. 2024, 16, 627. https://doi.org/10.3390/rs16040627 (Year: 2024).*

Mathew R. Schwaller, Heather J. Lynch, Arnaud Tarroux, Brandon Prehn, A continent-wide search for Antarctic petrel breeding sites with satellite remote sensing, Remote Sensing of Environment, vol. 210, 2018, pp. 444-451, ISSN 0034-4257, https://doi.org/10.1016/j.rse.2018.02.071. (Year: 2018).*

Xiaoyi, Shen et al., Analysis of Antarctic Emperor Penguins Colonies Changes Based on Remote Sensing, vol. 19, No. 8, pp. 1132-1140 of the main text, date of issue Aug. 31, 2017.

Peng Zhao et al., Estimating animal population size with very high-resolution satellite imagery, vol. 35, No. 1, pp. 316-324 of the main text, date of issue Feb. 24, 2021.

* cited by examiner

FECES COLOR-BASED REMOTE SENSING ESTIMATION METHOD AND APPARATUS FOR ANTARCTIC BIRD POPULATION SIZE

CROSS-REFERENCE TO RELATED APPLICATIONS

This application claims the benefit of the Chinese Patent Applications No. 202210088306.1, filed on Jan. 25, 2022, the disclosure of which is incorporated herein by reference in its entirety.

TECHNICAL FIELD

The present invention relates to the field of animal remote sensing technology, and more particularly to a feces color-based remote sensing estimation method and apparatus for Antarctic bird population size.

BACKGROUND

Antarctica, as the last "clean land" in the world, is given more and more attention from more and more countries in recent years because of its rich natural resources and intrinsic scientific and aesthetic values. However, the ecological environment of Antarctica is extremely fragile, and the study of Antarctic bird populations is important to reveal the ecological environment of Antarctica in recent years.

Currently, Antarctic bird population size can be obtained by manual counting, but the manual counting method is often affected by undesirable factors such as time, distance, and danger, leading to large errors in the calculation results, and humans entering into Antarctic for a field trip can also cause damage to the ecology of Antarctica.

SUMMARY

The present invention provides a feces color-based remote sensing estimation method and apparatus for Antarctic bird population size to overcome at least one technical problem existing in the prior art.

According to a first aspect of an embodiment of the present invention, a feces color-based remote sensing estimation method for Antarctic bird population size is provided, which comprises: determining a reflectance value range of a mixture of new feces and old feces in a remote sensing image; determining a sample mixture area where the mixture is located, based on the reflectance value range of the mixture in the remote sensing image; classifying the sample mixture area into a plurality of grade areas and determining an area of each grade area based on an obtained reflectance value of the sample mixture area; and generating a one-to-one correspondence between a density of birds of each grade area in the sample mixture area and the each grade area based on the area of the each grade area and an obtained number of birds in the each grade area.

Optionally, determining two interest areas for new feces and old feces in a remote sensing image; and determining a reflectance value range of a mixture of the new feces and the old feces based on two obtained reflectance values of the two interest areas for the new feces and the old feces.

Optionally, generating an image having color characteristics of new feces and old feces by image enhancement processing a sample remote sensing image of a study area based on a difference between color of the old feces of Antarctic birds and color of the new feces of Antarctic birds to generate an image having color characteristics of new feces and old feces; and determining two interest areas in the image having color characteristics of new feces and old feces.

Optionally, determining a proportion of the new feces in the sample mixture area based on the obtained reflectance value of the sample mixture area; and classifying the sample mixture area into a plurality of grade areas and determining an area of each grade area, based on the proportion of the new feces.

Optionally, obtaining a number of birds of each grade area; calculating a density of birds in the each grade area and a number of birds in the each grade area based on an area of the each grade area to generate a one-to-one correspondence between the density of birds in the each grade area and the each grade area in the sample mixture area.

According to a second aspect of the embodiment of the present invention, a feces color-based remote sensing estimation apparatus for Antarctic bird population size is provided, which comprises: a sampling module for determining a reflectance value range of a mixture of new feces and old feces in a remote sensing image; a comparing module for determining a sample mixture area where the mixture is located in the remote sensing image, based on the reflectance value range of the mixture; a classifying module for classifying the sample mixture area into a plurality of grade areas and determining an area of each grade area, based on an obtained reflectance value of the sample mixture area; a generating module for generating a one-to-one correspondence between a density of birds of each grade area of the sample mixture area and each grade area, based on the area of the each grade area and an obtained number of birds of each grade area.

Optionally, the sampling module specifically comprises a first sampling submodule and a second sampling submodule, wherein the first sampling submodule is used for determining two interest areas for new feces and old feces in a remote sensing image; the second sampling submodule is used for determining a reflectance value range of a mixture of the new feces and the old feces, based on two obtained reflectance values of the two interest areas for new feces and old feces.

Optionally, the first sampling submodule specifically comprises a third sampling submodule and a fourth sampling submodule, wherein the third sampling submodule is used for image enhancement processing a sample remote sensing image of a study area to generate an image having color characteristics of the new feces and the old feces, based on a difference between color of old feces of Antarctic birds and color of new feces of Antarctic birds; and the fourth sampling submodule is used for determining two interest areas in the image having the color characteristics of the new feces and the old feces.

Optionally, the classifying module specifically comprises a first classifying submodule and a second classifying submodule, wherein the first classifying submodule is used for determining a proportion of the new feces in the sample mixture area, based on an obtained reflectance value of the sample mixture area; the second classifying submodule for classifying the sample mixture area into a plurality of grade areas, based on the proportion of the new feces and determining the area of the each grade area.

Optionally, the generating module specifically comprises a first generating submodule and a second generating submodule, wherein the first generating submodule is used for obtaining a number of birds of each grade area; the second generating submodule is used for calculating a density of birds of each grade area based on an area of the each grade area and a number of birds in the each grade area to generate a one-to-one correspondence between the density of birds in the each grade area and the each grade area in the sample mixture area.

According to the embodiments of the present invention, the innovative points of the present invention include:

1. The present invention can extract the required data through remote sensing images, avoid human entering for a field trip, and can perform the whole process without the influence of adverse factors such as time, distance and danger, so as to avoid the error caused by the above adverse factors on the detection results, as well as avoid the damage caused by humans entering into the Antarctic for the field trip on the Antarctic ecology, which is one of the innovative points of the embodiments of the present invention.

2. The present invention can divide the feces into multiple grades by the color difference between new feces and old feces, establish the correlation between each grade and the corresponding density of birds, and estimate the number of birds by using the correlation to improve the accuracy of the estimation results, which is one of the innovative points of the embodiments of the present invention.

3. The present invention can detect by a satellite or an unmanned aerial vehicle, which can achieve shorter duration and greater frequency of detection activities and wider detection range, which is one of the innovative points of the embodiments of the present invention.

4. The present invention can detect Antarctic bird populations through remote sensing technology, avoid interference and destruction of wildlife populations and their habitats, and protect the ecological environment of Antarctica, which is one of the innovative points of the embodiments of the present invention.

BRIEF DESCRIPTION OF DRAWINGS

In order to more clearly illustrate the technical solutions of the embodiments of the present invention or the prior art, the present invention is further described in detail below in combination with the accompanying drawings needed to be used in the embodiment or the prior art. Obviously, the following drawings are only used to explain some embodiments of the present invention. For those skilled in the art, without paying creative labor, other relevant drawings can also be obtained from these drawings.

DETAILED DESCRIPTION OF EMBODIMENTS

The technical solutions of the embodiments of the present invention will be clearly and completely described below in conjunction with the accompanying drawings for the embodiments of the present invention, and it is clear that the described embodiments are only a part of the embodiments of the present invention, and not all of them. Based on the embodiments in the present invention, all other embodiments obtained by those skilled in the art without creative labor should fall within the protection scope of the present invention.

It is worth mentioning that the terms "comprising" and "having" and any modifications thereof in the embodiments and the accompanying drawings of the present invention are intended to cover non-exclusive inclusion. For example, a process, method, system, product, or apparatus comprising a series of steps or units is not limited to the listed steps or units, but optionally also includes steps or units not listed, or optionally also includes other steps or units inherent to those processes, methods, products, or apparatus.

Embodiment 1

The embodiment provides a feces color-based remote sensing estimation method for Antarctic bird population size. In the present embodiment, a reflectance value range of a mixture of new feces and old feces and a one-to-one correspondence between a density of birds of each grade area of the sample mixture area and each grade area can be calculated based on a remote sensing image, in this way, in practical applications, for a large-area remote sensing image of Antarctic birds to be counted, firstly, the mixture area to be counted in the remote sensing images can be graded and classified, and then based on an area of each grade area, the calculated reflectance value range of the mixture of the new feces and the old feces, and the one-to-one correspondence between a density of birds of each grade area of the sample mixture area and each grade area, and each number of birds which is corresponding to each grade area in the large-area remote sensing image of Antarctic birds to be counted can be calculated and a total number of birds in the large-area remote sensing image of Antarctic birds to be counted can be calculated, finally.

In the present embodiment, the above process for calculating the reflectance value range of the mixture of the new feces and the old feces and the one-to-one correspondence between each grade area in the sample mixture area of the new feces and the old feces and the density of birds based on the remote sensing image is explained in detail.

Figure 1:
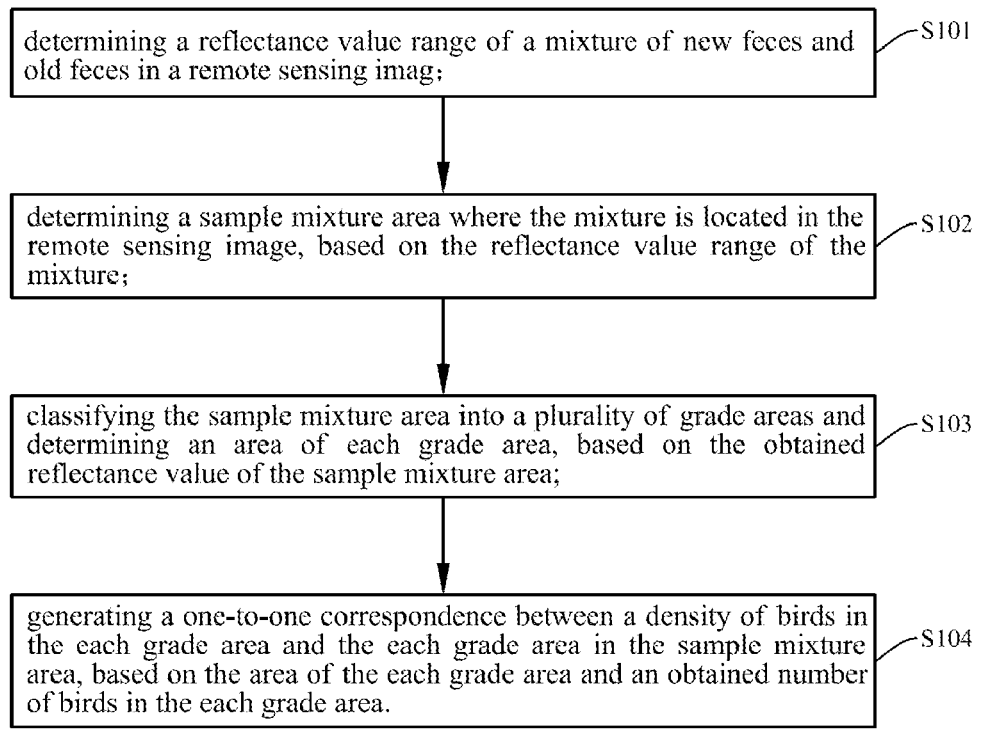
FIG. 1 is a flow chart of a feces color-based remote sensing estimation method for Antarctic bird population size of the present invention.

Referring to FIG. 1, FIG. 1 is a flow chart of a feces color-based remote sensing estimation method for Antarctic bird population size of the present invention. As shown in FIG. 1, the feces color-based remote sensing estimation method for Antarctic bird population size comprises the following steps:

Step 101: determining a reflectance value range of the mixture of the new feces and the old feces in a remote sensing image.

Specifically, a surface feature spectrum data is extracted from the remote sensing image by remote sensing techniques, the surface feature spectrum is processed to obtain information of a mixture of the new feces and the old feces, so as to determine a reflectance value range of the mixture of the new feces and the old feces.

It is worth mentioning that determining the reflectance value range of the mixture of the new feces and the old feces can be used for calculating the total number of birds in the remote sensing image to be counted in a subsequent practical application.

Figure 2:
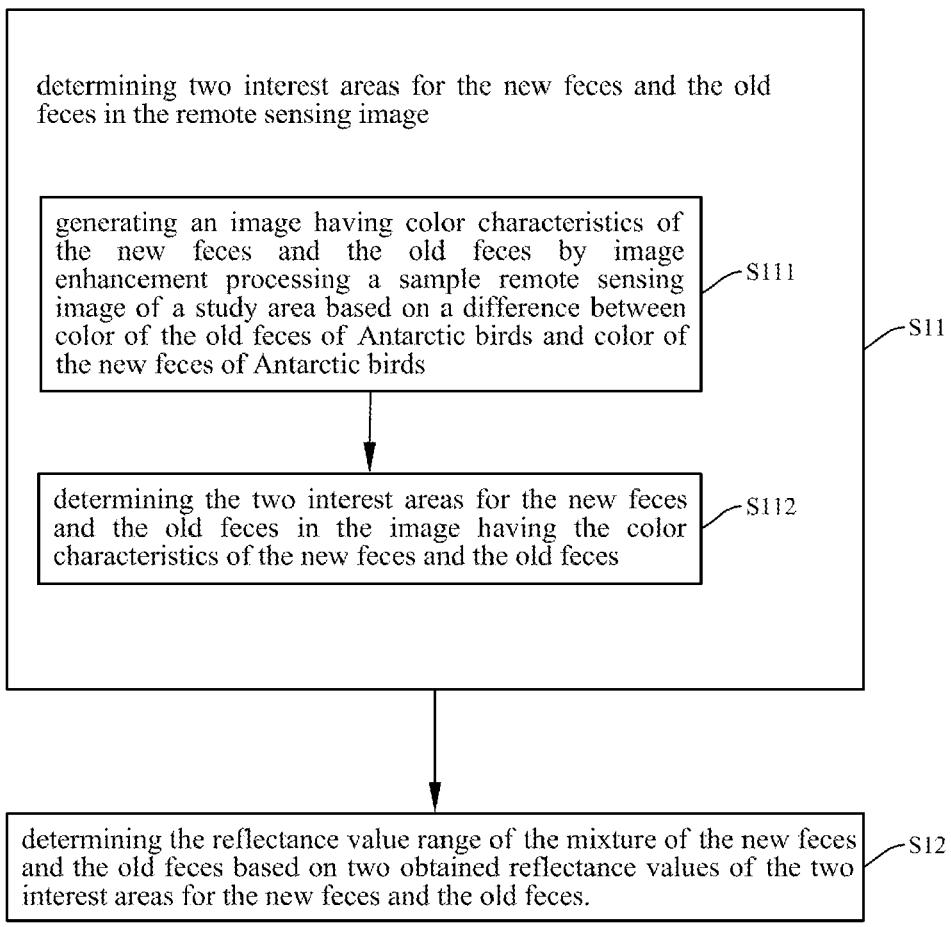
FIG. 2 is a flow chart of a specific process of step 101 of the present invention.

Optionally, referring to FIG. 2, FIG. 2 is a flow chart of a specific process of step 101 of the present invention, and as shown in FIG. 2, the step 101 comprises the following steps:

Substep 11: obtaining two interest areas for the new feces and the old feces based on the remote sensing image.

Specifically, the remote sensing image is a sample remote sensing image of the study area obtained by remote sensing technology, and based on the characteristic differences between the surface feature spectrum data of the new feces and the old feces of Antarctic birds, the sample remote sensing image is image processed to generate an image having characteristic information of the new feces and the old feces, the image having the characteristic information of the new feces and the old feces is the remote sensing image, and then based on the remote sensing image, the two interest areas for the new feces and the old feces are obtained.

It is to be noted that the sample remote sensing image of the study area can be obtained by a high-resolution satellite or a high-resolution unmanned aerial vehicle.

Substep 12: determining a reflectance value range of a mixture of the new feces and the old feces in a remote sensing image, based on two obtained reflectance values of the two interest areas for the new feces and the old feces.

In a specific implementation, the reflectance values of the two interest areas for the new feces and the old feces can be obtained by analyzing the surface feature spectrum data extracted from the sample remote sensing image.

Specifically, the reflectance value range of the mixture of the new feces and the old feces can be obtained by the following steps: first, counting the reflectance values of the two interest areas for the new feces and the old feces, and then, combining the normal distribution curves of the reflectance values of the new feces and the old feces, taking the reflectance value range corresponding to an overlapping area of the two normal distribution curves as the reflectance value range of the mixture of the new feces and the old feces.

Further, in practical applications, in order to exclude invalid data, e.g., noise, and to enhance the confidence of the measured parameter, the counted reflectance values of the two interest areas for the new feces and the old feces are combined with the normal distribution curves of the reflectance values of the new feces and the old feces to take a 95% confidence interval of the reflectance value range corresponding to an overlapping area of the two normal distribution curves as the reflectance value range of the mixture of the new feces and the old feces.

Specifically, counting the 95% confidence interval of the reflectance value range of the two interest areas for the new feces and the old feces, selecting $[c_{1new}, c_{2new}]$, $[c_{1old}, c_{2old}]$ as the endpoints. The reflectance value range of $[c_{1new}, c_{1old}]$ is used to represent the new feces and the reflectance values range of $[c_{2new}, c_{2old}]$ is used to represent the old feces; the reflectance value range of $[c_{1old}, c_{2new}]$ are obtained to represent the reflectance value range of the mixture of the new feces and the old feces.

Optionally, referring to FIG. 2, Substep 11 comprises the following steps:

Substep 111: generating an image having color characteristics of the new feces and the old feces by image enhancement processing a sample remote sensing image of a study area based on a difference between color of the old feces of Antarctic birds and color of the new feces of Antarctic birds.

Specifically, due to the unique dietary habits of Antarctic birds, there will be a clear distinction among their fecal colors, and the feces colors will changes over time such that there is a clear difference between the color of the old feces and the color of the new feces; for example, penguins are an Antarctic birds, and penguins mainly feed on krill, so the new feces is reddish brown while the old feces is gray. In practical applications, the relevant parameters in the image enhancement process can be adjusted according to the dietary habits of the birds to be counted to more accurately distinguish between the new feces and the old feces.

Substep 112: determining the two interest areas for the new feces and the old feces in the image having the color characteristics of the new feces and the old feces.

It should be noted that determining the two interest areas for the new feces and the old feces is to distinguish the sample mixture areas of the new feces from the sample mixture area of the mixture of the new feces and the old feces in subsequent steps.

It should still be noted that the new feces can reflect the current distribution range of Antarctic bird populations and the old feces can reflect information of the historical distribution range of Antarctic bird populations, erosion of habitat by melted water, and changes in the spatial pattern of Antarctic bird populations.

Step 102: determining a sample mixture area where the mixture is located in the remote sensing image, based on a reflectance value range of the mixture.

In the step 102, obtaining the reflectance values of the areas in the remote sensing image by analyzing the surface feature spectrum data of the remote sensing image, and then determining the sample mixture area where the mixture is located by comparing the reflectance value with the reflectance value range of the mixture.

Step 103: classifying the sample mixture area into a plurality of grade areas and determining an area of each grade area, based on the obtained reflectance value of the sample mixture area.

Specifically, firstly, obtaining a remote sensing image of the sample mixture area, secondly, obtaining a surface feature spectrum data of the sample mixture area from the remote sensing image, and finally, obtaining a reflectance value of the sample mixture area by processing the surface feature spectrum data of the sample mixture area.

It should be noted that the reflectance value of the sample mixture area reflects the current population of Antarctic birds in the area in a certain extent, therefore, based on the reflectance value, the sample mixture area can be classified into several grade areas, and then each grade area is studied separately to obtain a density of birds of each grade area, which can make the subsequent results of estimating a number of birds more accurate. Understandably, the finer the grade area is, the higher the accuracy is.

Figure 3:
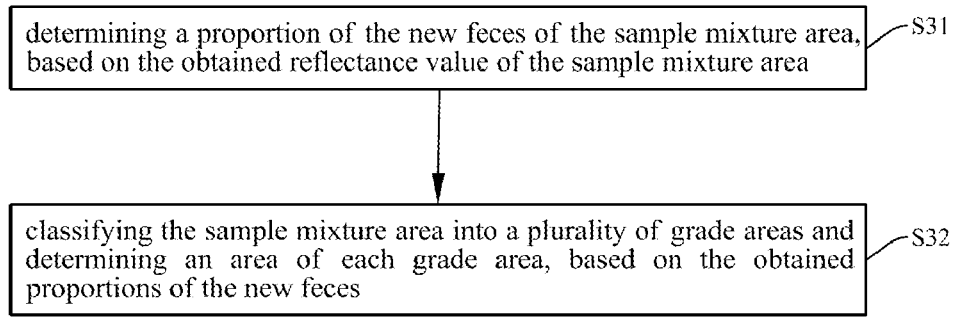
FIG. 3 is a flow chart of a specific process of step 103 of the present invention.

Optionally, referring to FIG. 3, FIG. 3 is a flow chart of a specific process of step 103 of the present invention, and as shown in FIG. 3, the step 103 comprises the following steps:

Substep 31: determining a proportion of the new feces of the sample mixture area, based on the obtained reflectance value of the sample mixture area.

In a specific implementation, the correspondence between different sub-areas of a field sample mixture area and the proportions of the new feces is determined by field sampling the mixture in advance and measuring the reflectance value of the field sample mixture area in the case where the proportion of the new feces in the field sampled mixture is known, in order to determine the proportion of the new feces of the sample mixture area in a practical application based on the reflectance value of the field sample mixture area.

Step 32: classifying the sample mixture area into a plurality of grade areas and determining an area of each grade area, based on the obtained proportions of the new feces.

Specifically, firstly, in the sample mixture area for which the proportion of the new feces has been determined, the sample mixture area can be classified into a plurality of grade areas based on the proportion of the new feces, and each grade area has a different proportion of the new feces, and finally, each grade area corresponding to each grade is determined.

Wherein, an area of each grade area can be obtained by obtaining the number of pixels and the size of the pixels of each grade area from the sample remote sensing image, and the product of the number of pixels and the size of the pixels of each grade area is the area of each grade area.

It should also be noted that since the proportion of the new feces directly affects the reflectance value of the sample mixture area, the surface feature spectrum data of the sample mixture area can be extracted from the remote sensing image, and based on the surface feature spectrum data, the correspondence between the reflectance value of each sub-area in the sample mixture area and the proportion of the new feces is counted, and finally the sample mixture area is classified into sub-areas having different reflectance value ranges, and the lower the reflectance value is, the lower the proportion of the new feces is, and a sub-area is a grade area.

In practical applications, the sample mixture area can be classified into n classes according to the following calculation methods: [100%, 100×(1−1/n) %], [100×(1−1/n) %, 100×(1−2/n) %] ..., [100×(1−(n−1)/n) %, 0], and the larger the value of n is, the higher the accuracy of the classification of the sample mixture area is.

For example, it is possible to take n=5, and based on the above calculation method, the sample mixture area is classified into 5 grade areas according to the proportion of the new feces of 100%-80%, 80%-60%, 60%-40%, 40%-20% and 20%-0, the sample mixture area is classified into 5 grade areas.

Step 104: generating a one-to-one correspondence between the density of birds in each grade area and each grade area in the sample mixture area, based on an area of each grade area and a number of birds in each grade area.

Specifically, there is a one-to-one correspondence between the number of birds and the area of the grade area, and the one-to-one correspondence between the density of birds of each grade area in the sample mixture area and each grade area can be applied to subsequently calculate the number of birds corresponding to each grade area in the large-area remote sensing image of Antarctic birds to be counted.

Figure 4:
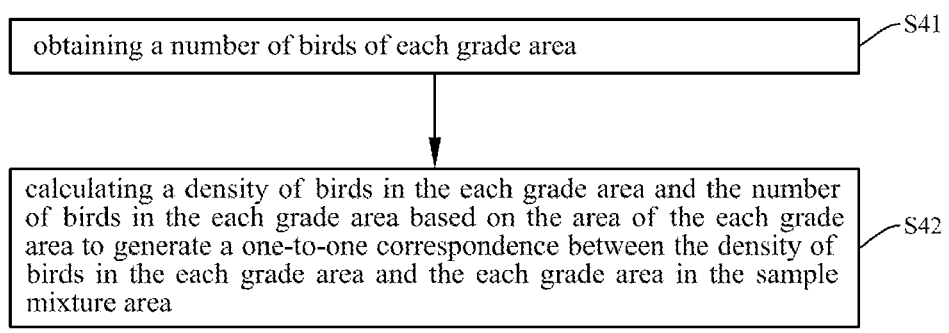
FIG. 4 is a flow chart of a specific process of step 104 of the present invention.

Optionally, referring to FIG. 4, FIG. 4 is a flow chart of a specific process of step 104 of the present invention, and as shown in FIG. 4, the step 104 comprises the following steps:

Substep 41: obtaining a number of birds of each grade area.

In a specific implementation, the number of birds of each grade area can be obtained by the sample remote sensing image to directly count Antarctic birds of each grade area.

Substep 42: calculating a density of birds in each grade area and the number of birds in each grade area based on the area of each grade area to generate a one-to-one correspondence between the density of birds in each grade area and each grade area in the sample mixture area.

Specifically, the ratio of the number of birds of each grade area to the area of each grade area corresponding to each grade area is the density of birds of each grade area.

It is to be noted that, since there are significant differences among the density of birds of different grade areas, a one-to-one correspondence between the density of birds and the grade areas can be provided so that each grade area is associated with the density of birds of each grade area. In this way, in a specific operation, the one-to-one correspondence between the grade areas and the densities of birds in the sample mixture area which is already calculated in the present embodiment can be applied to calculate the number of birds corresponding to each grade area in the large-area remote sensing image of Antarctic birds to be counted.

It can be understood that the one-to-one correspondence between the grade area of the sample mixture area and the density of birds calculated in the present embodiment is territorial, and in a practical application, the application scope needs to be predetermined according to the actual situation.

It can be seen that the one-to-one correspondence relation between the grade area of the sample mixture area and the density of birds calculated in the present embodiment lays the foundation for counting accurately the number of Antarctic birds of a large-area remote sensing image by utilizing the relation in a subsequent process; wherein, the whole process described in the present embodiment, whose data extracting is based on the remote sensing image from satellites or unmanned aerial vehicles. It can be understood that the present invention can achieve a greater detection frequency and wider detection range; and the whole process does not require manual access to the field, so that the detection is not limited by distance and has a high safety and shorter duration.

Embodiment 2

The embodiment provides an application of the feces color-based remote sensing estimation method for Antarctic bird population size. In the present embodiment, for a large-area remote sensing image of Antarctic birds to be counted, a number of birds in the remote sensing image of Antarctic birds to be counted can be calculated by utilizing the calculated reflectance value range of the mixture of new feces and old feces in Embodiment 1 and the one-to-one correspondence between the density of birds in each grade area of the sample mixture area and each grade area in this case where the reflectance value range of the mixture of the new feces and the old feces and a one-to-one correspondence between the density of birds in each grade area of the sample mixture area and each grade area are calculated by a small-area sample remote sensing image of Antarctic birds in Embodiment 1.

It is noted that the study area of the present embodiment is the same as Embodiment 1, and the classification basis of the mixture area of the new feces and the old feces in present embodiment is the reflectance value range of the mixture of the new feces and the old feces in Embodiment 1, and the classification standard for each grade area in the mixture area of the new feces and the old feces in present embodiment are the same as described in Embodiment 1.

Figure 5:
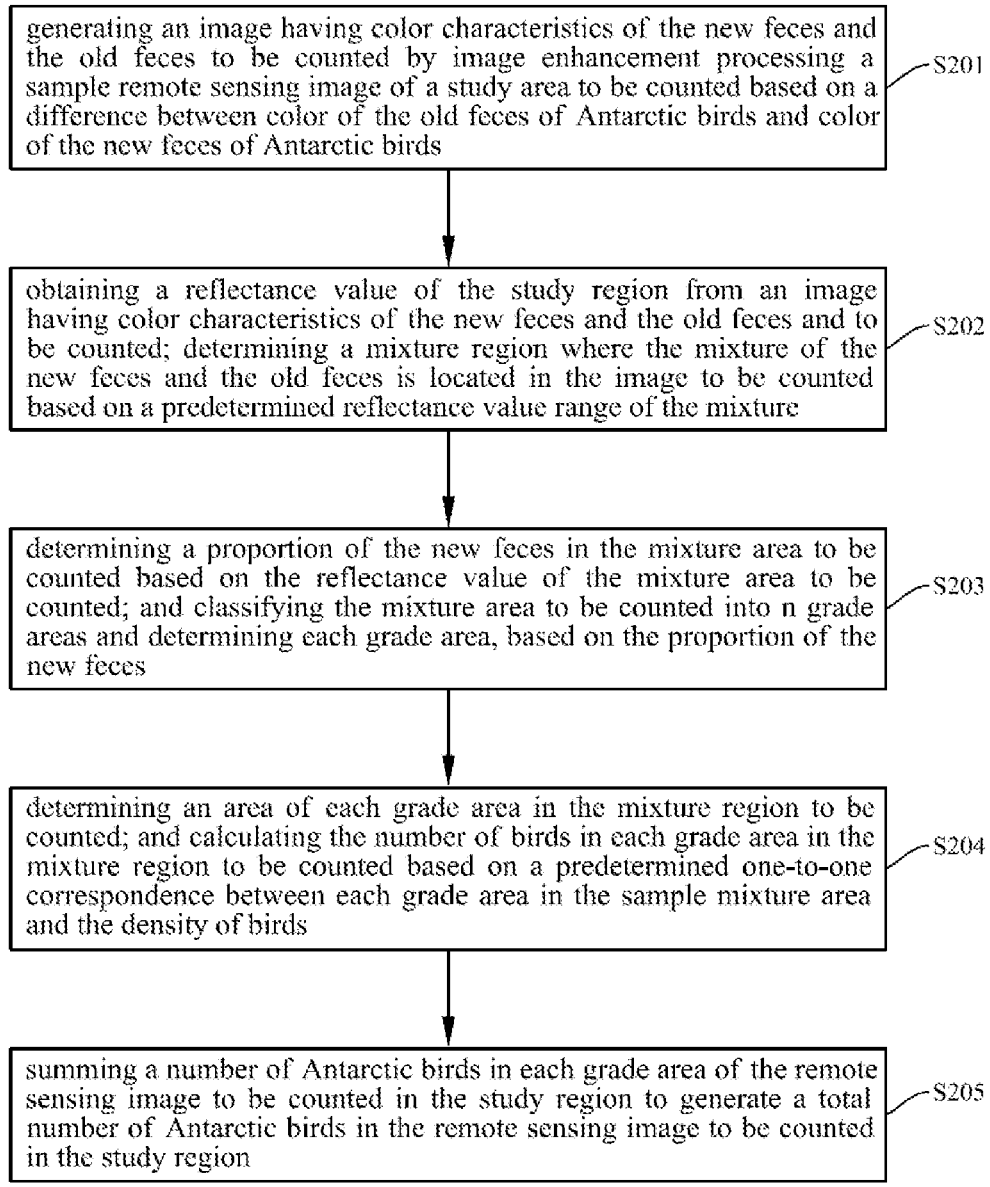
FIG. 5 is a flow chart of an application of the feces color-based remote sensing estimation method for Antarctic bird population size of the present invention.

Referring to FIG. 5, which is a flow chart of an application of the feces color-based remote sensing estimation method for Antarctic bird population size of the present invention. As shown in FIG. 5, the application of the feces color-based remote sensing estimation method for Antarctic bird population size comprises the follow steps:

Step 201, generating an image having color characteristics of the new feces and the old feces to be counted by image enhancement processing a sample remote sensing image of a study area to be counted based on a difference between color of the old feces of Antarctic birds and color of the new feces of Antarctic birds.

In the present step, the remote sensing image of a study area to be counted is image enhancement processed to enhance the color difference between the new feces and the old feces, so as to generate the image having the color characteristics of the new feces and the old feces and to be counted, and determine the number of birds of the study area by a subsequent step, based on a color of the old feces of Antarctic birds and a color of the new feces of Antarctic birds.

Specifically, a suitable band or a combination of bands can be selected for image enhancement processing the remote sensing image to be counted of the study region, wherein the bands are obtained by analyzing the surface feature spectrum data extracted from an image provided by a high-resolution satellite or a high-precision unmanned aerial vehicle to make the useful information in the blurred image clearer and to enhance the image interpretation and identifiability effect; the processed image has a higher discrimination between the new feces and the old feces to be used for classifying more accurately the study region in the image to be counted in a subsequent step.

It is to be noted that, due to the unique dietary habits of Antarctic birds, there will be a clear distinction among their fecal colors, and the feces colors will changes over time such that there is a clear difference between the color of the old feces and the color of the new feces; for example, penguins are an Antarctic birds, and penguins mainly feed on krill, so the new feces is reddish brown while the old feces is gray. In practical applications, the relevant parameters in the image enhancement process can be adjusted according to the dietary habits of the birds to be counted to more accurately distinguish between the new feces and the old feces.

In a specific implementation, the remote sensing image of the study region to be counted can be obtained by a high-resolution satellite or a high-resolution unmanned aerial vehicle.

Step 202: obtaining a reflectance value of the study region from an image having color characteristics of the new feces and the old feces and to be counted; determining a mixture region where the mixture of the new feces and the old feces is located in the image to be counted based on a predetermined reflectance value range of the mixture.

Wherein, the predetermined reflectance value range of the mixture is calculated to obtain in advance, specifically, from step 101 in Embodiment 1.

In the present step, firstly, counting the reflectance value of the study region; secondly, selecting the mixture regions to be counted where the mixture of the new feces and the old feces is located in the image to be counted based on the reflectance value range of the mixture of the new feces and the old feces, which is calculated form step 101 in Embodiment 1 since the proportion of the new feces in the mixture directly affects the reflectance value of the mixture.

Wherein, the reflectance value can be obtained by analyzing the surface feature spectrum data extracted from the image of the high-precision unmanned aerial vehicle.

Step 203: determining a proportion of the new feces in the mixture area to be counted based on the reflectance value of the mixture area to be counted; and classifying the mixture area to be counted into n grade areas and determining each grade area, based on the proportion of the new feces.

In the present step, firstly, determining a proportion of the new feces in a determined mixture area to be counted, which has a specific process referring to step 101 in Embodiment 1; secondly, classifying the mixture area to be counted into n grade areas based on the proportion of the new feces, wherein each grade area has a different proportion of the new feces, and determining each grade area corresponding to each class.

In a specific implementation, the correspondence between different sub-areas of a sample mixture area and the proportions of the new feces is determined by sampling the mixture in advance and measuring the reflectance value of the sample mixture area in the case where the proportion of the new feces in the sampled mixture is known, in order to determine the proportion of the new feces of the sample mixture area in a practical application based on the reflectance value of the sample mixture area.

In practical applications, the mixture area to be counted can be classified into n classes according to the following calculation methods: [100%, 100×(1−1/n) %], [100×(1−1/n) %, 100×(1−2/n) %] . . . , [100×(1−(n−1)/n) %, 0], and the larger the value of n is, the higher the accuracy of the classification of the mixture area to be counted is.

It is further noted that the value of n described in the present step is identical to the value of n described in Embodiment 1.

Step 204: determining an area of each grade area in the mixture region to be counted; and calculating the number of birds in each grade area in the mixture region to be counted based on a predetermined one-to-one correspondence between each grade area in the sample mixture area and the density of birds.

Wherein, the number of pixels and the size of the pixels of each grade area can be obtained from the remote sensing image to be counted in the study region, and the product of the number of pixels and the size of the pixels of each grade area is the area of the each grade area.

Step 205: summing a number of Antarctic birds in each grade area of the remote sensing image to be counted in the study region to generate a total number of Antarctic birds in the remote sensing image to be counted in the study region.

As can be seen, in the present embodiment, the number of birds corresponding to each grade area is calculated according to different grade areas, and the number of Antarctic birds in the remote sensing image to be counted in the study region is finally obtained, wherein the whole process described in the present embodiment, whose data extraction is based on the remote sensing image of the satellite or the unmanned aerial vehicle. It can be understood that the present invention can achieve a greater detection frequency and a wider detection range; and the whole process does not require manual access to the field, so that the detection is not limited by the distance, which has a high security and a shorter duration.

It should be noted that, in a specific implementation, usually, the study region is firstly classified into several parts in space according to the differences in height, distance from the sea, etc., and then the classified parts is separately calculated such that the impact of the detection result due to factors such as height and humidity can be avoided.

Embodiment 3

Figure 6:
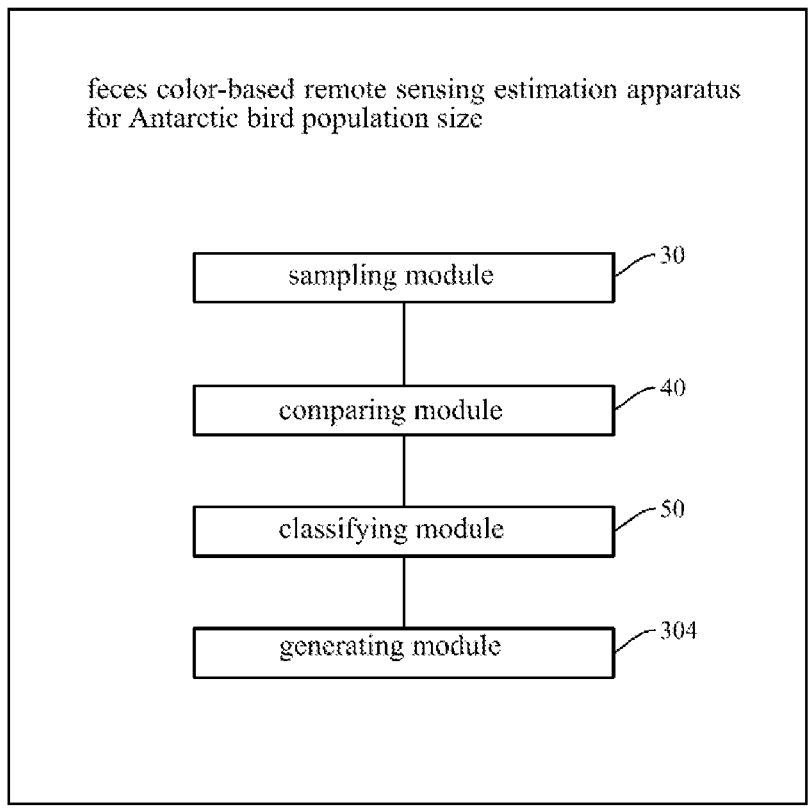
FIG. 6 is a structural schematic diagram of a feces color-based remote sensing estimation apparatus for Antarctic bird population size of the present invention.

The present invention provides a feces color-based remote sensing estimation apparatus for Antarctic bird population size of the present invention, referring to FIG. 6, FIG. 6 is a structural schematic diagram of a feces color-based remote sensing estimation apparatus for Antarctic bird population size of the present invention. As shown in FIG. 6, the feces color-based remote sensing estimation apparatus for Antarctic bird population size comprises:

a sampling module 30 for determining a reflectance value range of a mixture of new feces and old feces in the remote sensing image;

a comparing module 40 for determining a sample mixture area where the mixture is located in the remote sensing image, based on a reflectance value range of the mixture;

a classifying module 50 for classifying the sample mixture area into a plurality of grade areas and determining an area of each grade area, based on the obtained reflectance value of the sample mixture area;

a generating module 60 for generating a one-to-one correspondence between a density of birds in each grade area and each grade area in the sample mixture area, based on an area of each grade area and an obtained number of birds in each grade area.

Figure 7:
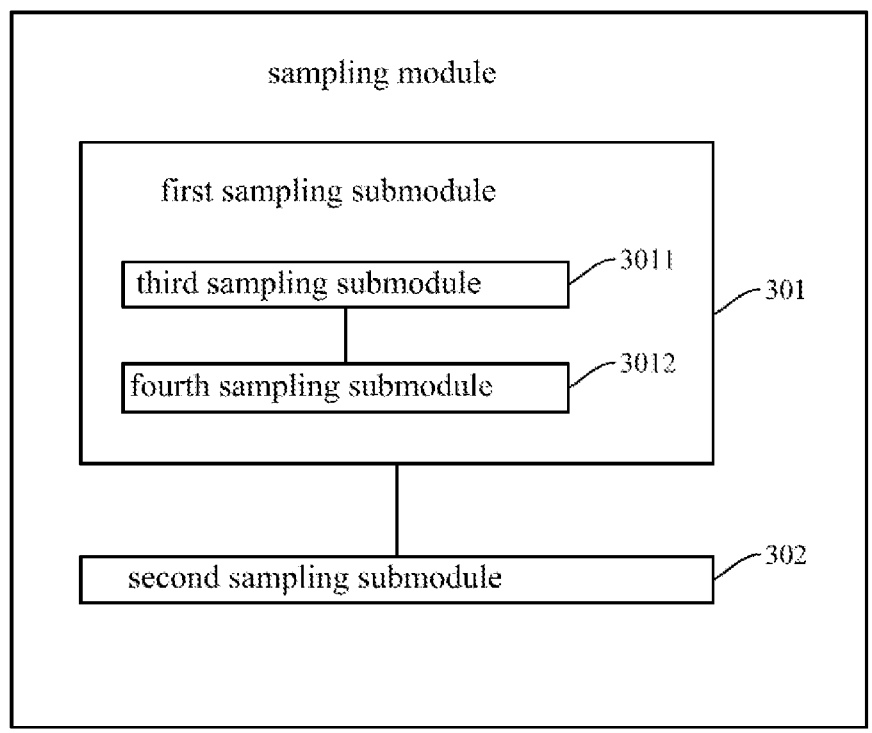
FIG. 7 is a structural schematic diagram of a sampling module proposed in the present invention.

Optionally, as shown in FIG. 7, a sampling module 30 specifically comprises a first sampling submodule 301 and a second sampling submodule 302.

The first sampling submodule 301 is used for determining two interest areas for the new feces and the old feces from an obtained sampling image.

The second sampling submodule 302 is used for determining a reflectance value range of a mixture of the new feces and the old feces, based on two obtained reflectance values of the two interest areas for the new feces and the old feces.

Optionally, as shown in FIG. 7, a first sampling submodule 301 specifically comprises a third sampling submodule 3011 and a fourth sampling submodule 3012.

The third sampling submodule 3011 is used for generating an image having color characteristics of the new feces and the old feces by image enhancement processing a sample remote sensing image of a study area based on a difference between a color of the old feces of Antarctic birds and a color of the new feces of Antarctic birds.

The fourth sampling submodule 3012 is used for determining the two interest areas for the new feces and the old feces in the image having the color characteristics of the new feces and the old feces.

Figure 8:
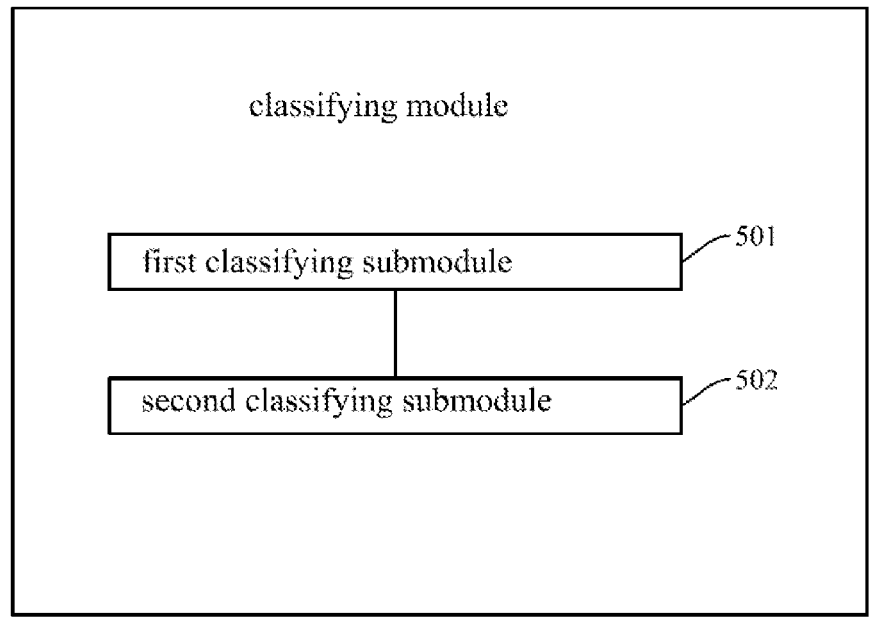
FIG. 8 is a structural schematic diagram of a classifying module proposed in the present invention.

Optionally, as shown in FIG. 8, a classifying module 50 specifically comprises a first classifying submodule 501 and a second classifying submodule 502.

The first classifying submodule 501 is used for determining a proportion of the new feces of the sample mixture area, based on the obtained reflectance value of the sample mixture area.

The second classifying submodule 502 is for classifying the sample mixture area into a plurality of grade areas and determining an area of each grade area, based on the obtained proportions of the new feces.

Figure 9:
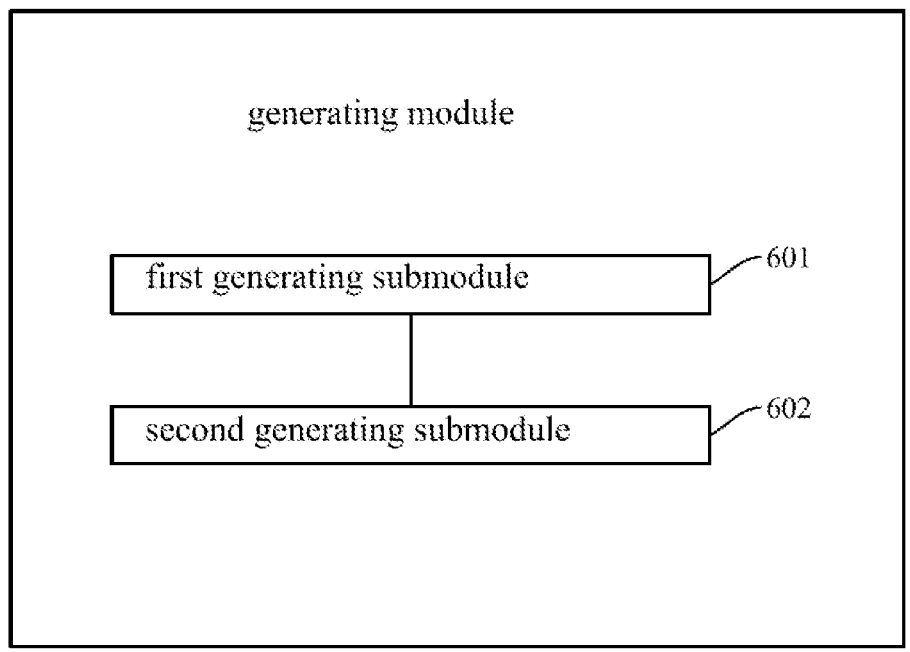
FIG. 9 is a structural schematic diagram of a generating module proposed in the present invention.

Optionally, as shown in FIG. 9, a generating module 60 specifically comprises a first generating submodule 601 and a second generating submodule 602.

The first generating submodule 601 is used for obtaining a number of birds in each grade area.

The second generating submodule 602 is used for calculating a density of birds in each grade area and the number of birds in each grade area based on an area of each grade area to generate a one-to-one correspondence between the density of birds in each grade area and each grade area in the sample mixture area.

As can be seen, the feces color-based remote sensing estimation apparatus for Antarctic bird population size, which is provided in the present invention, can calculate a density of birds corresponding to each grade area and calculate a number of birds corresponding to each grade area according to the density of birds, finally obtain the number of Antarctic birds in the remote sensing image in the study region, and improve the accuracy of the estimation results, wherein the whole process, whose data extraction is based on the remote sensing image of the satellite or the unmanned aerial vehicle. It can be understood that the present invention can achieve a greater detection frequency and a wider detection range; and the whole process does not require manual access to the field, so that the detection is not limited by the distance, which has a high security and a shorter duration.

Those skilled in the art can understand: the accompanying drawings are only schematic diagrams for embodiments, and the modules or processes in the accompanying drawings are not necessarily necessary to implement the present invention.

The basic principles of the present invention is described as mentioned above in connection with specific embodiments, however, it should be noted that the superiorities, advantages, effects, etc. mentioned in the present invention are only examples and not limitations, and they cannot be considered as necessary for each embodiment of the present invention. Furthermore, the above-disclosed specific details are intended for exemplary purposes and for ease of understanding only, and are not limiting, and the above-disclosed details do not limit the present invention as having to employ the above-disclosed specific details to be realized.

The schematic diagrams of the devices, apparatus, equipment, and systems involved in this application are intended to be illustrative examples only and are not intended to require or imply that they must be connected, arranged, or configured in the manner illustrated in the block diagrams. As will be recognized by those skilled in the art, the devices, apparatus, equipment, systems may be connected, arranged, and configured in any manner. Words such as "including," "comprising," "having," and the like are open-ended terms that mean "including, but not limited to" and may be used interchangeably therewith. The words "or" and "and" as used herein refer to the words "and/or" and are used interchangeably therewith, unless the context clearly indicates otherwise. The term "such as" as used herein refers to the phrase "such as, but not limited to" and is used interchangeably with it.

Finally, it should be noted that the above embodiments are intended only to illustrate the technical solutions of the present invention and not to limit them; although the present invention is described in detail with reference to the preceding embodiments, it should be understood by those skilled in the art that it is still possible to modify the technical solutions described in the preceding embodiments or to replace some of the technical features by equivalent substitutions thereof; and that these modifications or substitutions do not does not make the essence of the correspond-

What is claimed is:

1. A feces color-based remote sensing estimation method for Antarctic bird population size, comprising the following steps:
   determining a reflectance value range of a mixture of new feces and old feces in a remote sensing image;
   determining a sample mixture area where the mixture is located in the remote sensing image, based on the reflectance value range of the mixture;
   classifying the sample mixture area into a plurality of grade areas and determining an area of each grade area, based on the obtained reflectance value of the sample mixture area, comprising:
      determining a proportion of the new feces of the sample mixture area, based on the obtained reflectance value of the sample mixture area;
      classifying the sample mixture area into the plurality of grade areas and determining the area of each grade area, based on the obtained proportions of the new feces; and
   generating a one-to-one correspondence of a density of birds in each grade area of the plurality of grade areas, based on the determined area of each grade area and an obtained number of birds in each grade area; and
   wherein the step of determining the reflectance value range of the mixture of the new feces and the old feces in the remote sensing image comprises:
      determining two interest areas for the new feces and the old feces in the remote sensing image; and
      determining the reflectance value range of the mixture of the new feces and the old feces based on two obtained reflectance values of the two interest areas for the new feces and the old feces.

2. The feces color-based remote sensing estimation method for Antarctic bird population size, as recited in claim 1, wherein the step of determining two interest areas for the new feces and the old feces in the remote sensing image comprises:
   generating an image having color characteristics of the new feces and the old feces by image enhancement processing a sample remote sensing image of a study area based on a difference between a color of the old feces of Antarctic birds and a color of the new feces of Antarctic birds;
   determining the two interest areas for the new feces and the old feces in the image having the color characteristics of the new feces and the old feces.

3. The feces color-based remote sensing estimation method for Antarctic bird population size, as recited in claim 1, wherein the step of generating a one-to-one correspondence between the density of birds in each grade area and each grade area in the sample mixture area, based on the area of each grade area and an obtained number of birds in each grade area;
   obtaining the number of birds of each grade area;
   calculating the density of birds in each grade area and the number of birds in each grade area based on the area of each grade area to generate a one-to-one correspondence between the density of birds in each grade area and each grade area in the sample mixture area.

4. A feces color-based remote sensing estimation apparatus for Antarctic bird population size, comprising:
   a processor; and
   a storage device configured to store one or more programs which, when executed by the processor, cause the processor to:
   determine a reflectance value range of a mixture of new feces and old feces in a remote sensing image;
   determine a sample mixture area where the mixture is located in the remote sensing image, based on the reflectance value range of the mixture;
   classify the sample mixture area into a plurality of grade areas and determining an area of each grade area, based on the obtained reflectance value of the sample mixture area;
   generate a one-to-one correspondence between a density of birds in each grade area and each grade area in the sample mixture area, based on the area of each grade area and an obtained number of birds in each grade area;
   wherein the processor further:
   determines a proportion of the new feces of the sample mixture area, based on the obtained reflectance value of the sample mixture area; and
   classifies the sample mixture area into a plurality of grade areas and determining the area of each grade area, based on the obtained proportion of the new feces; and
   determines two interest areas for the new feces and the old feces from the remote sensing image, and
   determines the reflectance value range of the mixture of the new feces and the old feces, based on two obtained reflectance values of the two interest areas for the new feces and the old feces.

5. The feces color-based remote sensing estimation apparatus for Antarctic bird population size, as recited in claim 4, wherein the processor further:
   generates an image having color characteristics of the new feces and the old feces by image enhancement processing a sample remote sensing image of a study area based on a difference between a color of the old feces of Antarctic birds and a color of the new feces of Antarctic birds; and
   determines the two interest areas for the new feces and the old feces in the image having the color characteristics of the new feces and the old feces.

6. The feces color-based remote sensing estimation apparatus for Antarctic bird population size, as recited in claim 4, wherein the processor further:
   obtains the number of birds of each grade area; and
   calculates the density of birds in each grade area and the number of birds in each grade area based on the area of each grade area to generate a one-to-one correspondence between the density of birds in each grade area and each grade area in the sample mixture area.

7. The feces color-based remote sensing estimation method for Antarctic bird population size, as recited in claim 1, wherein the step of determining a proportion of the new feces of the sample mixture area, based on the obtained reflectance value of the sample mixture area comprises:
   determining a correspondence between reflectance values of different sub-areas of the sample mixture area and the proportions of the new feces is determined by field sampling; and
   determining the proportion of the new feces of the sample mixture area, based on the obtained reflectance value of the sample mixture area and the determined correspondence.

8. The feces color-based remote sensing estimation method for Antarctic bird population size, as recited in claim 1, wherein the step of determining the reflectance value range of the mixture of the new feces and the old feces based on two obtained reflectance values of the two interest areas for the new feces and the old feces comprises:
- counting the reflectance values of the two interest areas for the new feces and the old;
- combining normal distribution curves of the reflectance values of the new feces and the old feces; and
- taking a reflectance value range corresponding to an overlapping area of the normal distribution curves as the reflectance value range of the mixture of the new feces and the old feces.

9. The feces color-based remote sensing estimation method for Antarctic bird population size, as recited in claim 8, wherein taking a 95% confidence interval of the reflectance value range corresponding to the overlapping area of the two normal distribution curves as the reflectance value range of the mixture of the new feces and the old feces.

10. The feces color-based remote sensing estimation method for Antarctic bird population size, as recited in claim 9, wherein the step of taking a 95% confidence interval of the reflectance value range corresponding to the overlapping area of the two normal distribution curves as the reflectance value range of the mixture of the new feces and the old feces comprises:
- counting the 95% confidence interval of the reflectance value range of the two interest areas for the new feces and the old feces; and
- selecting $[c_{1new}, c_{2new}]$, $[c_{1old}, c_{2old}]$ as endpoints;
- wherein the reflectance value range of $[c_{1new}, c_{1old}]$ represents the new feces and the reflectance value range of $[c_{2new}, c_{2old}]$ represents the old feces; the reflectance value range of $[c_{1old}, c_{2new}]$ represents the reflectance value range of the mixture of the new feces and the old feces.

11. The feces color-based remote sensing estimation method for Antarctic bird population size, as recited in claim 1, wherein the step of generating an image having color characteristics of the new feces and the old feces by image enhancement processing a sample remote sensing image of a study area based on a difference between a color of the old feces of Antarctic birds and a color of the new feces of Antarctic birds comprises:
- adjusting relevant parameters in an image enhancement process, according to dietary habits of the birds to be counted.

12. The feces color-based remote sensing estimation method for Antarctic bird population size, as recited in claim 1, wherein the step of determining the area of each grade area, based on the obtained proportions of the new feces comprises:
- obtaining a number of pixels and a size of the pixels of each grade area from the sample remote sensing image, and
- taking a product of the number of pixels and the size of the pixels of each grade area as the area of each grade area.

13. The feces color-based remote sensing estimation apparatus for Antarctic bird population size, as recited in claim 4, wherein the processor further:
- determines a correspondence between reflectance values of different sub-areas of the sample mixture area and the proportions of the new feces is determined by field sampling; and
- determines the proportion of the new feces of the sample mixture area, based on the obtained reflectance value of the sample mixture area and the determined correspondence.

14. The feces color-based remote sensing estimation apparatus for Antarctic bird population size, as recited in claim 4, wherein the processor further:
- counts the reflectance values of the two interest areas for the new feces and the old;
- combines normal distribution curves of the reflectance values of the new feces and the old feces; and
- takes a reflectance value range corresponding to an overlapping area of the normal distribution curves as the reflectance value range of the mixture of the new feces and the old feces.

15. The feces color-based remote sensing estimation apparatus for Antarctic bird population size, as recited in claim 14, wherein the processor further:
- takes a 95% confidence interval of the reflectance value range corresponding to the overlapping area of the two normal distribution curves as the reflectance value range of the mixture of the new feces and the old feces.

16. The feces color-based remote sensing estimation apparatus for Antarctic bird population size, as recited in claim 15, wherein the processor further:
- counts the 95% confidence interval of the reflectance value range of the two interest areas for the new feces and the old feces; and
- selects $[c_{1new}, c_{2new}]$, $[c_{1old}, c_{2old}]$ as the endpoints;
- wherein the reflectance value range of $[c_{1new}, c_{1old}]$ represents the new feces and the reflectance value range of $[c_{2new}, c_{2old}]$ represents the old feces; the reflectance value range of $[c_{1old}, c_{2new}]$ represents the reflectance value range of the mixture of the new feces and the old feces.

17. The feces color-based remote sensing estimation apparatus for Antarctic bird population size, as recited in claim 4, wherein the processor further:
- adjusts relevant parameters in an image enhancement process, according to dietary habits of the birds to be counted.

18. The feces color-based remote sensing estimation apparatus for Antarctic bird population size, as recited in claim 4, wherein the processor further:
- obtains a number of pixels and a size of the pixels of each grade area from the sample remote sensing image, and
- takes a product of the number of pixels and the size of the pixels of each grade area as the area of each grade area.

* * * * *